US009645336B2

(12) United States Patent
Benjamin et al.

(10) Patent No.: US 9,645,336 B2
(45) Date of Patent: May 9, 2017

(54) OPTICAL CONNECTIONS HAVING MAGNETIC COUPLING (71) Applicant: Corning Cable Systems LLC, Hickory, NC (US)

(72) Inventors: Seldon David Benjamin, Painted Post, NY (US); Davide Domenico Fortusini, Ithaca, NY (US); Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 601 days.

(21) Appl. No.: 13/891,870

(22) Filed: May 10, 2013

(65) Prior Publication Data
US 2014/0205235 A1 Jul. 24, 2014

Related U.S. Application Data (60) Provisional application No. 61/699,081, filed on Sep. 10, 2012, provisional application No. 61/699,102, filed on Sep. 10, 2012.

(51) Int. Cl.
G02B 6/42 (2006.01)
G02B 6/46 (2006.01)
G02B 6/38 (2006.01)

(52) U.S. Cl.
CPC ............ *G02B 6/4292* (2013.01); *G02B 6/46* (2013.01); *G02B 6/3829* (2013.01);
(Continued)

(58) Field of Classification Search
None
See application file for complete search history.

(56) References Cited

U.S. PATENT DOCUMENTS 4,641,915 A * 2/1987 Asakawa et al. ............... 385/26
5,784,511 A * 7/1998 Kikuchi et al. ................. 385/57
(Continued)

FOREIGN PATENT DOCUMENTS

EP 2453281 A1 5/2012 ............. G02B 6/42
WO WO 2012/078697 A1 6/2012 ............. G02B 6/38

OTHER PUBLICATIONS

Patent Cooperation Treaty, International Search Report and Written Opinion for International Application No. PCT/US2013/05388; Mailing Date Jan. 3, 2014—9 pages.
(Continued)

*Primary Examiner* — Mike Stahl (57) ABSTRACT

Optical connections for optical communication having in-line optical paths and magnetic coupling portions are disclosed. In one embodiment, an optical connection includes a lens block having an optical interface portion that defines an in-line optical path without an optical turn for optical signals propagating through the lens block, and a magnetic coupling portion disposed about at least a portion of the lens block. In another embodiment, a method of making an optical connection that includes providing a circuit board having one or more active components and placing a lens block on the circuit board. The lens block includes an optical interface portion defining an in-line optical path. The method further includes placing at least one magnetic coupling portion about the lens block. The at least one magnetic coupling portion is configured as a bulk magnetic material. Electronic devices and fiber optic cable assemblies are also disclosed.

30 Claims, 6 Drawing Sheets (52) U.S. Cl.
 CPC .......... *G02B 6/3886* (2013.01); *G02B 6/425* (2013.01); *G02B 6/4214* (2013.01); *G02B 6/4246* (2013.01); *Y10T 29/49826* (2015.01)

(56) References Cited

U.S. PATENT DOCUMENTS

| | | |
|---|---|---|
| 7,817,006 B2 | 10/2010 | Fullerton et al. |
| 2004/0114866 A1 | 6/2004 | Hiramatsu ............... 385/39 |
| 2006/0023998 A1* | 2/2006 | Williams et al. ........... 385/33 |
| 2006/0093270 A1* | 5/2006 | Fenwick et al. ........... 385/57 |
| 2007/0122079 A1* | 5/2007 | Drabarek et al. ........... 385/39 |
| 2008/0298814 A1* | 12/2008 | Epitaux et al. ............ 398/200 |
| 2009/0196550 A1* | 8/2009 | Ohtorii .................... 385/33 |
| 2010/0027941 A1* | 2/2010 | Stewart et al. ............ 385/57 |
| 2010/0080563 A1* | 4/2010 | DiFonzo et al. .......... 398/115 |
| 2010/0135618 A1 | 6/2010 | Howard et al. ............ 385/79 |
| 2011/0038582 A1 | 2/2011 | Defonzo et al. |
| 2012/0039562 A1* | 2/2012 | Tan et al. ................ 385/14 |
| 2012/0148195 A1* | 6/2012 | Umeno .................... 385/53 |
| 2012/0163754 A1* | 6/2012 | Benjamin et al. .......... 385/33 |
| 2012/0177322 A1* | 7/2012 | Schwandt et al. ......... 385/53 |
| 2012/0195556 A1 | 8/2012 | Wang et al. .............. 385/77 |
| 2012/0213475 A1 | 8/2012 | Selli et al. ............... 385/33 |
| 2013/0182996 A1* | 7/2013 | Shastri et al. ............. 385/14 |
| 2014/0072261 A1* | 3/2014 | Isenhour et al. ........... 385/33 |

OTHER PUBLICATIONS

Ricker, "How Sony accidentally did the right thing with Light Peak", The Verge, article.
Patently Apple, "Apple introduces us to the Wild World of Coded Magnets", Celebrating Apple's Spirit of Invention, article.

\* cited by examiner

OPTICAL CONNECTIONS HAVING MAGNETIC COUPLING

CROSS-REFERENCE TO RELATED APPLICATIONS

This application claims the benefit of priority under 35 U.S.C. §119 of U.S. Provisional Application Ser. Nos. 61/699,081 filed on Sep. 10, 2012 and 61/699,102 filed on Sep. 10, 2012, the contents of which is relied upon and incorporated herein by reference in its entirety.

BACKGROUND

The disclosure generally relates to optical connections and, more particularly, to optical connections utilizing one or more magnetic coupling portions for alignment and retention of mated optical connections.

SUMMARY

Embodiments are directed to optical connections, such as optical connections utilized by optical cable assemblies and electronic devices, wherein electrical signals generated by a host or client electronic device are converted to optical signals by a transceiver circuit and transmitted over one or more optical fibers. Embodiments described herein may enable planar, liquid-displacing optical interface portions to precisely align optical components of coupled device (e.g., optical fibers and/or active components, such as laser diodes and photodiodes) without significant mechanical structure. Embodiments use coded magnetic arrays to precisely align optical channels of the coupled devices. The coded magnetic arrays may also provide a magnetic force to maintain a coupled relationship between the optical couplings of the coupled devices.

Embodiments described herein are generally directed to optical connections suitable for use on an electronic device and/or a fiber optic cable assembly having magnetic coupling portions for both alignment and retention. In some embodiments, at least one fiducial provides coarse alignment (i.e., alignment) of the optical connection between an optical interface portion disposed on the electronic device and an optical interface portion of the cable assembly. The mated magnetic coupling portions provide fine alignment and/or the retention (i.e., the retention force) of the optical connection at the optical interface portions between the optical connections. In the embodiments described herein, an in-line optical path is provided within the optical connection on the electronic device, which allows for the optical connection to be placed on a large surface of the electronic device, such as the backside of a laptop or cellular phone. An optical module of the optical connection provided in a fiber optic cable assembly provides for a turned optical path in which optical signals are turned by total internal reflection.

Accordingly, an embodiment of the disclosure relates to an optical connection including a lens block having an optical interface portion that defines an in-line optical path without an optical turn for optical signals propagating through the lens block, and a magnetic coupling portion disposed about at least a portion of the lens block.

Another embodiment of the disclosure relates to an electronic device including a housing defining a major surface and a minor surface, and an optical connection disposed the major surface of the housing. The optical connection includes a lens block having an optical interface portion that defines an in-line optical path without an optical turn for optical signals propagating through the lens block, and a magnetic coupling portion disposed about at least a portion of the lens block.

Yet another embodiment of the disclosure relates to a method of making an optical connection that includes providing a circuit board having one or more active components and placing a lens block on the circuit board. The lens block includes an optical interface portion defining an in-line optical path. The method further includes placing at least one magnetic coupling portion about the lens block. The at least one magnetic coupling portion is configured as a bulk magnetic material.

Yet another embodiment of the disclosure relates to a fiber optic cable assembly having an optical connector. The fiber optic cable assembly includes a fiber optic cable having a plurality of optical fibers, an optical module, and a magnetic coupling portion including a coded magnetic array that is disposed about at least a portion of the optical module. The optical module includes an optical interface portion and a fiber receiving portion that includes a plurality of fiber guides for receiving and securing the plurality of optical fibers of the fiber optic cable. The optical module may include at least one alignment fiducial.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments are directed to optical connections, such as optical connection utilized by fiber optic cable assemblies and electronic devices, wherein electrical signals generated by a host or client electronic device are converted to optical signals by a transceiver circuit and transmitted over one or more optical fibers. Optical signals received by a host or client electronic device are converted from optical signals into electrical signals by the transceiver circuit. The optical connections disclosed herein may allow for high-bandwidth speed communication to and/or from an electronic device. As an example and not a limitation, the optical connections described herein may be utilized in electronic devices in conjunction with a fiber network wherein optical fiber is routed throughout a home or place of business (e.g., an in-home fiber network or business fiber network). Conventional copper connectors and cabling are reaching bandwidth limitations as bandwidth requirements are ever increasing due to data-intensive applications, such as cloud computing, high definition television, ultra high definition television, and the like.

Embodiments described herein may enable planar, liquid-displacing optical interface portions to precisely align optical components of coupled device (e.g., optical fibers and/or active components, such as laser and photodiodes) without significant mechanical structure. The term planar means generally flat such that the optical interface portion is accessible and easily wiped by a user. In some embodiments, the optical interface portion may comprise some structural features but the region of optical coupling may remain substantially planar. Embodiments use coded magnetic arrays to precisely align optical channels of the coupled devices. The coded magnetic arrays also provide a magnetic force to maintain a coupled relationship between the optical connections (i.e., optical connectors) of the coupled devices. Optical connections, as well as electronic devices, optical interface systems, and methods of making optical connections will be described in further detail herein with specific reference to the appended figures.

Embodiments described herein are generally directed to optical connections suitable for use on an electronic device and/or a fiber optic cable assembly having magnetic coupling portions for both alignment and retention. In some embodiments, at least one fiducial provides coarse alignment (i.e., alignment) of the optical connection between an optical interface portion disposed on the electronic device and an optical interface portion of the cable assembly by guiding the placement of the magnetic coupling portion disposed on the optical connection with the complementary magnetic coupling portion of the cable assembly and the magnetic coupling portion provides fine alignment and/or the retention (i.e., the retention force) of the optical connection at the optical interface portions between the optical connection, such as on a device with the cable assembly.

In embodiments, a device optical connection having an in-line optical path may be disposed in a major surface of a housing of an electronic device. As used herein, the phrase "in-line optical path" means that optical signals propagating within the optical connection are not redirected or otherwise turned. As used herein, the phrase "major surface" means a large surface of an electronic device, such as a backside of a smart phone or a laptop computer, and the phrase "minor surface" means a small surface of an electronic device, such as the edge of a smart phone or a laptop computer, for example.

Figure 1:
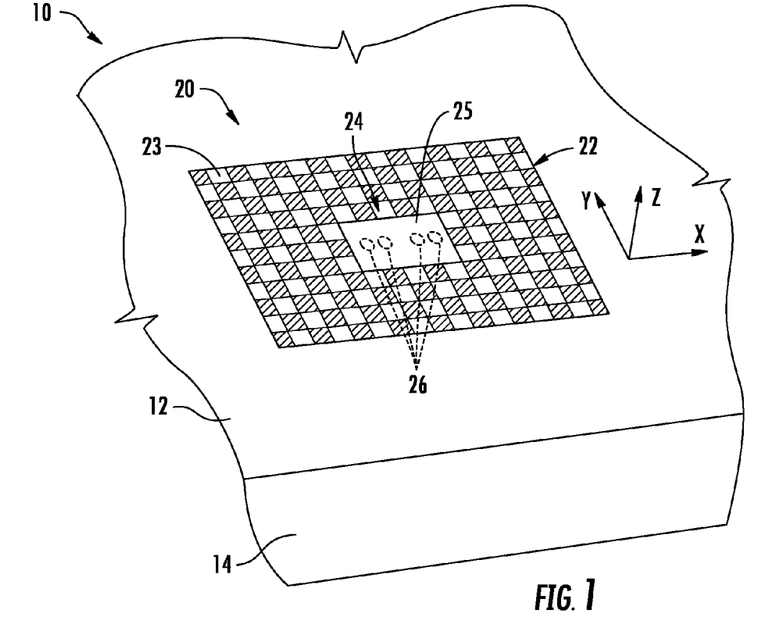
FIG. 1 is a partial top-down elevated view of an example optical connection of an electronic device according to one or more embodiments of the disclosure.

Referring initially to FIG. 1, a schematic illustration of an optical connection 20 provided within a major surface 12 of an electronic device 10 is illustrated. The electronic device 10 may be any electronic device, including, but not limited to, a portable media player, a cellular phone (e.g., a "smart phone") a data storage device (e.g., an external hard drive or a flash-based memory device), a digital camera, a laptop, notebook, or tablet computer, a camcorder, a mobile electronic device, a server, major appliance (e.g., refrigerator, washing machine) and the like. The electronic device 10 may be any electronic device wherein data is transferred between one electronic device to another electronic device.

Generally, the optical connection 20 comprises a lens block 24 having a optical interface portion 25 and a lens surface 27, and at least one magnetic coupling portion 22 comprising a plurality of magnetic regions 23. The lens block 24 is made of an optically transmissive material that allows optical signals to propagate therethrough. The optical interface portion 25, which is configured to receive an optical interface portion of a mated connector of an optical cable assembly, is surface accessible. As used herein, the phrase "surface accessible" means that the surface is substantially free from structure such that it may be easily wiped clean of liquid and debris by a user. However, it should be understood that some structure may be present and still allow a user to wipe the optical interface portion free of liquid and debris. In some embodiments, the optical interface portion 25 is substantially planar with respect to the major surface 12 of the electronic device 10. In other embodiments, the optical interface portion 25 may be offset with respect to the major surface 12.

Figure 2:
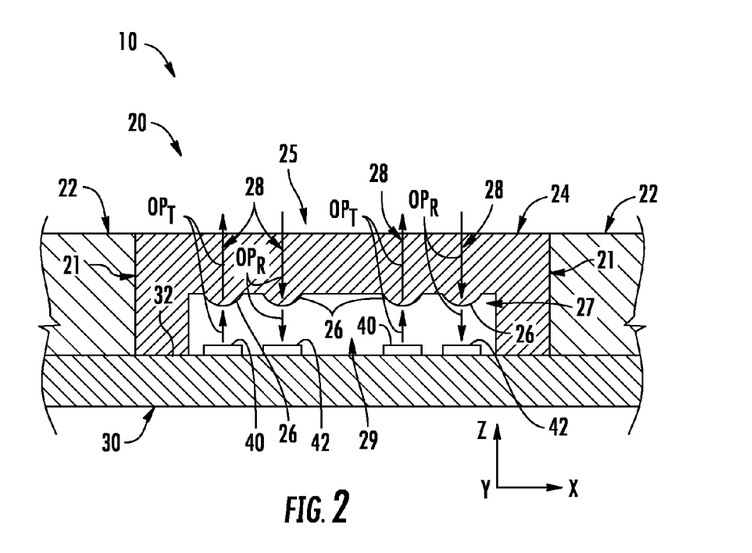
FIG. 2 is a cross-section view of the optical connection depicted in FIG. 1.

Referring now to FIG. 2, the lens block 24 comprises a lens surface 27 that includes one or more lens elements 26, which may be configured as refractive or covered refractive lenses (e.g., a cover spaced from a lenses for protecting the lens), for example. In other embodiments, the lens elements 26 may be configured as gradient-index (GRIN) lenses. It should be understood that any number of lens elements 26 may be provided. In the illustrated embodiment, the lens elements 26 are integral on the lens surface 27 surface of the lens block 24. For example, the lens block 24 and its features (including the lens elements 26) may be fabricated by precision molding.

The lens block 24 is mechanically coupled to the surface 32 of a substrate, such as a circuit board 30. Also disposed on the surface 32 of the circuit board 30 are active components 40, 42 used for optical communication. The circuit board 30 and the lens block 24 define an enclosure 29 in which the active components 40, 42 are positioned. The active components may be configured as a transmitting active component 40 such as a laser diode (e.g., verticalcavity, surface-emitting laser ("VCSEL"), distributed Bragg reflector laser, Fabry-Perot laser, etc.) or a receiving active component 42, such as a photodiode.

The lens block 24 is coupled to the surface 32 of the circuit board 30 such that the lens elements 26 are aligned with the active components 40, 42 in the x-, y-, and z-directions. In the illustrated embodiment, the lens block 24 is attached to circuit board 30 by an integral mounting structure 21 configured as individual legs of the lens block 24.

As shown in FIG. 2, the lens block 24 provides optical channels 28 defining both transmitting in-line optical paths ($OP_T$) and receiving in-line optical paths ($OP_R$). Such in-line optical paths allow for the optical interface portion 25 of the lens block 24 to be disposed on a major surface of an electronic device. The lens block 24 may pass optical signals to and from a mated optical cable assembly (not shown in FIGS. 1 and 2 but described below). Accordingly, the lens block 24 provides for an in-line optical path that is generally normal to the circuit board 30 (i.e., no optical turn in the device) and exits on a major surface 12 of the electronic device 10. In other embodiments, the optical connection could provide for in-line optical paths with a shallow angle, such as thirty degrees or less.

The lens elements 26 may be spaced apart according to the desired dimensions of the optical interface portion 25. As shown in FIG. 2, the lens elements may be arranged in pairs, with each pair providing both a transmitting in-line optical path $OP_T$ and a receiving in-line optical path $OP_R$. It should be understood that each pair may only include transmitting in-line optical paths $OP_T$ or receiving in-line optical paths $OP_R$. Alternatively, the lens elements 26 may not be arranged in pairs but in groups of three or more, or not arranged in groups at all. The spacing between lens elements 26 may be such to achieve a desired dimension of the optical interface portion 25. As an example and not a limitation, the spacing between adjacent lens elements may be less than about 800 μm (microns) and may even be about 600 μm or less.

Referring to both FIGS. 1 and 2, the magnetic coupling portion 22 is disposed about the lens block 24. Although the magnetic coupling portion 22 is depicted as a single component that completely surrounds the lens block 24, embodiments are not limited thereto. For example, one or more magnetic coupling portions 22 may completely or only partially surround the lens block 24. Additionally, in alternative embodiments, the magnetic coupling portion 22 may not contact the lens block 24 but be offset from the lens block 24 by other material or components.

As described below, the magnetic coupling portion 22 provides fine alignment between optical channels of mated optical connections (i.e., an optical connection of a cable assembly and the optical connection 20 of the electronic device 10 depicted in FIGS. 1 and 2). The optical channel(s) 28 of the optical connection 20 need to be appropriately aligned for transferring the optical signal(s) across the lens surface 27 (i.e., from a cable assembly to a device and vice versa) with an appropriate coupling loss. By way of example, the alignment of axis of the optical signals between the optical interface portions of a fiber optic cable assembly and the electronic device provides an axis offset of 40 microns or less, and may be 20 microns or less, and may even have an axis offset of 10 microns or less for providing a suitable coupling loss such as 1 dB or less, but other suitable values are possible.

The magnetic coupling portion 22 may use one or more coded magnetic arrays or conventional magnets as desired. The selection of the coded magnetic arrays or conventional magnets may depend on the specific design used and desired alignment tolerance required for the application.

Referring to FIG. 1, coded magnetic arrays are coded in the sense that the polarity of each magnetic region 23 is in accordance with a magnetic coding pattern such that a first coded magnetic array may only mate with a corresponding coded magnetic array having a magnetic coding pattern that is opposite from the magnetic coding pattern of the first coded magnetic array. Simply stated, the polarization (specific pattern of north or south poles) of the individual magnetic regions 23 (i.e., magnetic pixels) of the coded magnetic array on the optical connection of the device are magnetically attracted to the polarization of the individual magnetic regions of the complementary magnetic code array disposed on the fiber optic cable assembly since respective magnetic regions have a pattern with the opposite polarities. Moreover, it is the plurality of individual magnetic regions 23 that allow the precise alignment (e.g., tighter alignment tolerance) since they reduce the variance in offset when mating (i.e., coupling of the optical interface portions) due to the nature of the array. Although, the magnetic regions 23 or "pixels" of the array are represented as square they can have any suitable size, shape or the like.

Generally speaking, the coded magnetic array can provide finer alignment control than conventional magnets. Moreover, the coded magnetic arrays can be written onto the blank magnetic material before, during or after assembly (in situ) of the optical connection 20 into the circuit board or device as desired, thereby providing manufacturing flexibility and further process control (between the optical channels of the lens block 24 and the magnetic coupling portion 22). In other words, the registration between optical channels 28 of the optical connection 20 and the magnetic coupling portion 22 can impact the alignment of the axis of the optical signals.

Illustratively, coded magnetic arrays may be magnetized (i.e., "written" with the desired magnetic profile/pixels) onto the magnetic material after final assembly, thereby avoiding having to make separate, very accurate magnets that are then precision aligned to the optical channels during assembly. Simply stated, coded magnetic arrays may be written onto the magnetic material defining the magnetic coupling portion 22 with the desired magnetic coding pattern using the optical channels as the reference which will not move relative to the writing of the magnetic array since the optical channels 28 and magnetic coupling portion 22 are fixed relative to each other. As described below, the magnetic coupling portion may be written on the magnetic material using an in-situ writing process using one or more features of the lens block 24.

Coded magnetic arrays may be advantageous since the use of many individual magnetic regions may allow for random alignment errors of a single magnet-to-magnet coupling relationship to cancel out. The coded magnetic arrays described herein may allow for optical couplings to self-align with respect to one another to the desired tolerance required for repeatable mating of the optical connection.

Use of such coded magnetic arrays for the magnetic coupling portion 22 may also be useful for a liquid displacing optical interface portion 25 (i.e., the generally flat coupling face provides a low-profile and sleek design and provides easy cleaning). Consequently, conventional magnets should not be confused with coded magnetic arrays; moreover, the coded magnets may allow for smaller tolerance for alignment and coupling compared with conventional magnets.

On the other hand, the magnetic coupling portion(s) may be configured as individual conventional magnets. The conventional magnetic regions may be configured as individual magnets that are provided in a molded magnet holder or the like that is disposed about the optical module or lens block. However, using conventional magnets may not be as robust as the coded magnetic arrays.

The concepts disclosed herein are simple and easy to manufacture. Moreover, the concepts disclosed herein may be used with connecting the electronic device to a fiber optic cable assembly, a docking station, and the like. The lens block 24 may use any suitable lens elements 26, such as a covered refractive lens design, GRIN lenses or other suitable optical interface portion. However, the designs illustrated herein use a lens block on the device side and an optical module that turns the optical signal on the cable assembly. Further, a cover may be used on the lens block and/or magnetic coupling portion for providing durability and protection. For instance, the cover may be a suitable strengthened glass or polymer for inhibiting damage and the like.

Additionally, the optical interface portion 25 may use an optional coating and/or glass cover interface to provide a robust and cleanable surface that protects internal components. The coating or glass cover may be coated to reduce friction and possibly reduce reflection related losses as well. Likewise, the optical interface portion 25 surface(s) may have a small angle relative to the normal direction to help reduce the impact of reflection, such as in the range of 1-3 degrees. However, other small angles may be possible with still being considered generally normal to the circuit board for in-line optical path for the device.

Figure 3:
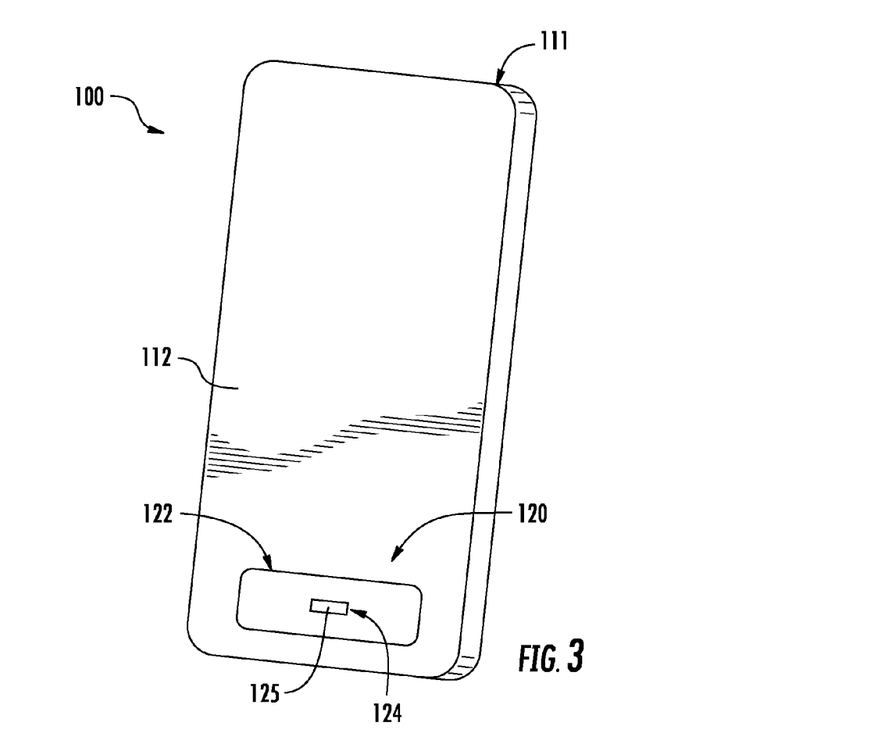
FIG. 3 depicts an optical connection positioned on backside major surface of an electronic device according to one or more embodiments of the disclosure.

The optical connections described herein may be incorporated into any electronic device. Referring now to FIG. 3, a mobile electronic device 100 configured as a smart phone includes an example optical connection 120 disposed in a major surface 112 of a housing 111 (e.g., a backside surface of a smart phone). The illustrated optical connection 120 includes a lens block 124 having an optical interface portion 125, and a magnetic coupling portion 122. It should be understood that embodiments of the present disclosure are not limited to the location and geometric configuration of the optical connection 120 depicted in FIG. 3. For example, in alternative embodiments, the optical connection 120 may be disposed in the middle of the major surface 112, or the magnetic coupling portion 122 may be configured with any suitable shape such as circular rather than rectangular as depicted in FIG. 3.

Figure 4:
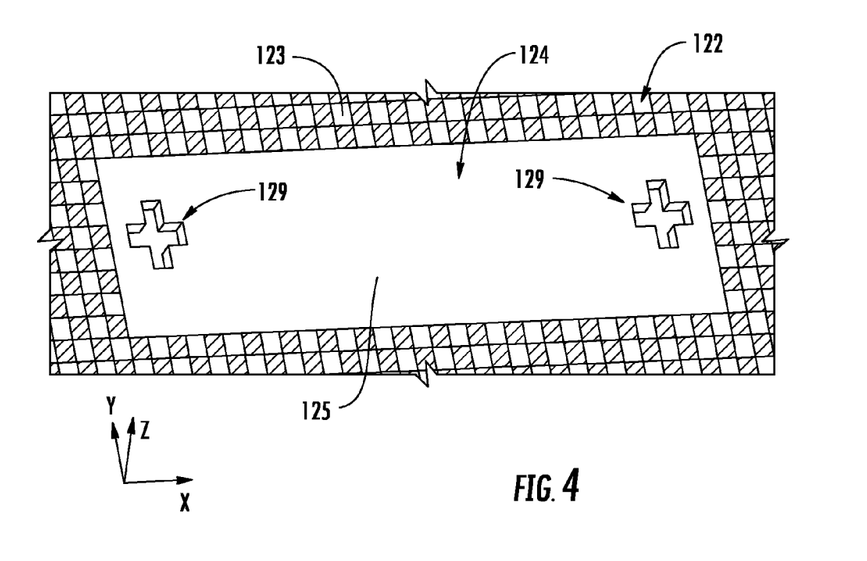
FIG. 4 is a close-up, partial view of the optical connection depicted in FIG. 3.

FIG. 4 is a close-up view of the optical interface portion 125 of the optical connection 120 depicted in FIG. 3. The optical interface portion 125 is provided in a lens block 124 and is configured for mating with a complimentary optical connection. The magnetic coupling portion 122 of the optical connection 120 may be configured as a coded magnetic array or as individual magnets as described above. In the illustrated embodiment, the magnetic coupling portion 122 is configured as a coded magnetic array defined by magnetic regions 123 or pixels having a magnetization state (i.e., "north" or "south") according to a magnetic coding pattern. "North" and "south" magnetization states are graphically illustrated by alternating white and black magnetic regions 123 in FIG. 4. Although the magnetic coding pattern is depicted in a checkerboard pattern for illustration of the concept, embodiments are not limited thereto. Any magnetic coding pattern may be utilized. As described above with respect to the embodiment depicted in FIGS. 1 and 2, the magnetic coupling portion 122 provides fine alignment of the optical channels 128 and the active components 140, 142.

The illustrated optical connection 120 further includes two alignment fiducials 129 disposed on the lens block 124 adjacent to the optical interface portion 125. It should be understood that more or fewer than two alignment fiducials may be provided, and that, in some embodiments, no alignment fiducials may be present. The alignment fiducial(s) 129 provides alignment along two directions, such as in the X and Y reference directions, and allows the magnetic coupling portion 122 to perform the fine optical axis alignment as well as provide a retention force for coupling the two complementary optical interface portions (e.g., the optical interface portion 125 of the illustrated optical connection 120 and an optical interface portion of an optical cable assembly). For instance, the alignment fiducial(s) 129 may be a cross-shaped recess cavity allowing fine movement in two directions. On the device side, the alignment fiducial(s) is preferably a recessed cavity, thereby providing a generally flush surface for the device, but it could be a male alignment fiducial if desired and the complementary optical connection of a cable assembly or the like could have the female alignment fiducial(s).

Figure 5A:
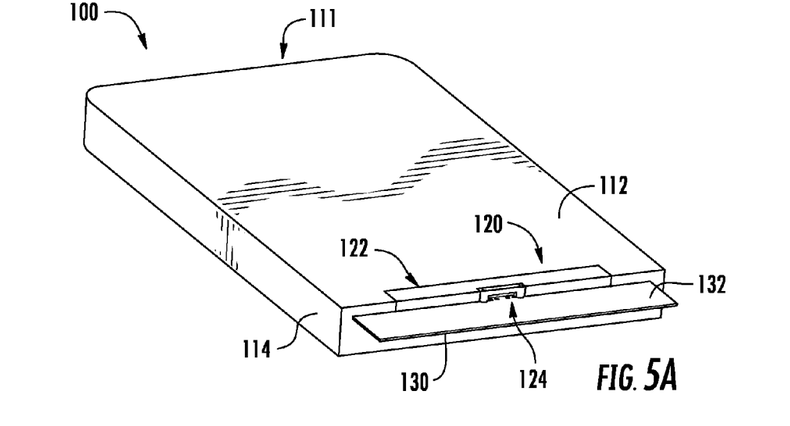
FIG. 5A is a cutaway view of the electronic device depicted in FIG. 3.
Figure 5B:
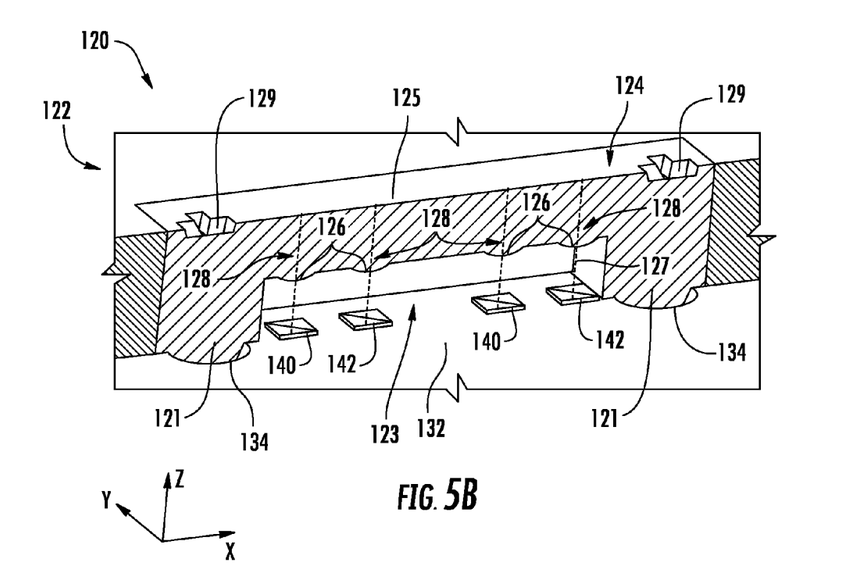
FIG. 5B is a close-up, cutaway view of the optical connection of the electronic device depicted in FIG. 5A.

Referring now to FIGS. 5A and 5B, cutaway views of the optical connection 120 of the electronic device depicted in FIGS. 3 and 4 are depicted. FIG. 5A is a cutaway view of the electronic device 100, while FIG. 5B is a close-up, cutaway view of the optical connection 120 of the electronic device 100 depicted in FIG. 5A. As shown in FIG. 5B, the lens block 124 has a first and second alignment fiducials 129 disposed on opposite sides of a plurality of optical channels 128 of the lens block. The optical channels 128 are defined by the lens elements 126 provided on a lens surface 127, which may be opposite from a surface of the optical interface portion 125.

The lens block 124 may be attached to a circuit board 130 (or other substrate) using mounting structure 121 integrally formed in the lens block 124, for example. As coupled to the surface 132 of the circuit board 130 are active components 140, 142 such as laser diodes (e.g., active components 140) and photo diodes (e.g., active components 142) for the transmission and receipt of optical signals, respectively. As an example and not a limitation, the mounting structure 121 or structures of the lens block 124 may be positioned within features (e.g., recesses 134) on the surface 132 of the circuit board 130. The features may also be configured as markings on the surface 132 of the circuit board 130 that are used as alignment fiducials to properly locate the lens block 124. The lens block 124 may be adhered to the circuit board 130 by the use of an appropriate adhesive. Then, the circuit board 130 may be used as a component of the electronic device 100. The optical connection 120 can be formed as a complete assembly that is attached to the circuit board 130 or constructed onto the circuit board 130 as desired.

The lens block 124 should be secured to the circuit board 130 such that the optical channels 128 of the lens block 124 are aligned with the active components 140, 142 in the X and Y directions to minimize optical coupling loss and ensure that the optical signals propagate through the lens block 124 both to and from the active components 140, 142. The alignment of the lens block 124 to circuit board 130 and secure coupling therebetween should be robust because forces may act directly on the lens block 124, which may impact optical alignment with the active components 140, 142 and therefore impact optical performance. In other words, the lens elements 126 that are formed in the lens surface 127 of the lens block 124 (i.e., lower surface) should be aligned with the active components 140, 142, such as VCSELs and photodiodes, for transmitting/receiving optical signals.

The magnetic coupling portion 122, which is configured as a coded magnetic array in the illustrated embodiment, is disposed about the lens block 124 and may also be coupled to the surface 132 of the circuit board 130. Although the magnetic coupling portion 122 is illustrated as a single region that surrounds the lens block 124, embodiments are not limited thereto. For example, several individual and non-continuous magnetic coupling portions 122 may be provided about the lens block 124. The area of the magnetic coupling portion 122 should be large enough to ensure retention between the optical connection 120 and a mated optical connection of a mated device, such as an optical cable assembly (see FIGS. 6A, 6B and 7). Generally, the major surface 112 of the electronic device 100 provides a large area for the magnetic coupling portion 122. As an example and not a limitation, the magnetic coupling portion 122 may have an area that is greater than about 50 square millimeters ($mm^2$) to prevent external angular forces from undesirably decoupling the mated optical connections.

The optical connection 120 can be formed as a complete assembly that is attached to the circuit board 130, or constructed onto the circuit board 130 as desired. In embodiments, the optical connection 120 may be isolated from the housing 111 of the electronic device 100 such as mounted on the circuit board 130 or the like, thereby inhibiting misalignment effects from the housing 111. In other embodiments, all or a portion of the optical interface portion 125 may be disposed on the housing 111 of the electronic device 100 as desired. If disposed on a portion of the housing 111, the magnetic material of the magnetic coupling portion 122 may be demagnetized, installed, and again magnetized (i.e., written) relative to the alignment fiducials or other features if needed. In further embodiments, the magnetic material may be on the same component that houses the lens block 124 so the optical connection 120 can be placed onto the circuit board 130 or the like as a complete assembly. An optional metallic shield (not shown, see FIG. 10C) may be disposed between the circuit board 130 and the magnetic coupling portion 122 of the optical connection 120 as desired for any of the embodiments described herein. The metallic shield may be provided to reduce magnetic field effects for the magnetic coupling portion 122 on the internal components of the circuit board 130 and or electronic device 100.

As shown in FIG. 5B, the optical connection 120 is positioned on or within the electronic device 100 to have an in-line optical path(s) that is generally normal to the surface 132 of the circuit board 130 of the electronic device 100 (i.e., no optical turn of optical signals is present in the electronic device 100). Optical signals propagating along the in-line optical path enter and exit a major surface 112 of the device. In other words, the optical axis of the optical connection 120 is generally normal to the circuit board 130 and generally aligned with a minor surface 114 (i.e., the thin edge) of the electronic device 100, and exits on the large, major surface 112 face of the electronic device 100 on a generally straight path without an optical turn. In other embodiments, the optical connection 120 may provide an in-line optical path with a shallow angle (e.g., thirty degrees or less), if desired. This provides a simple, robust and cost-effective optical connection for the electronic device 100.

Figures 6A, 6B:
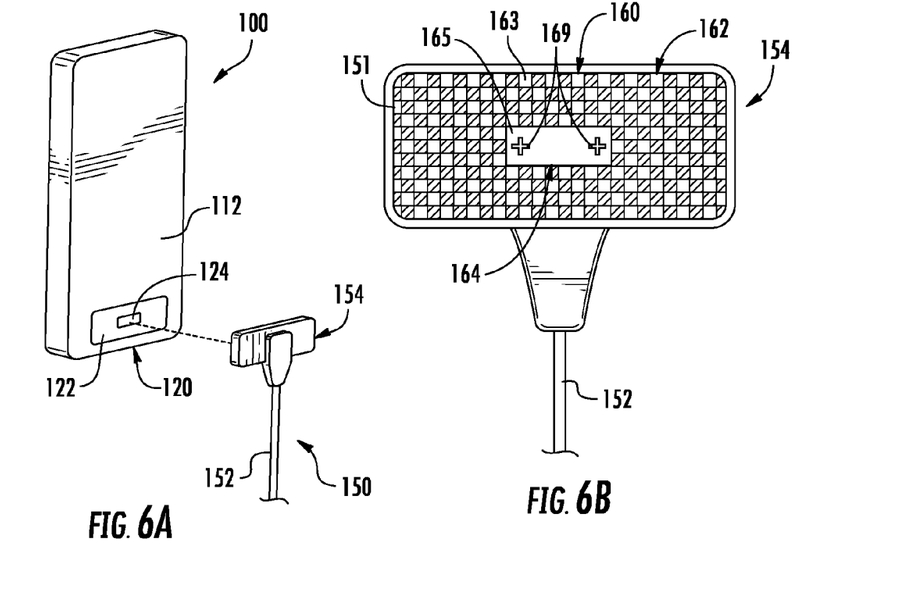
FIG. 6A depicts an exemplary fiber optic cable assembly decoupled from the electronic device depicted in FIG. 3 according to one or more embodiments of the disclosure.
FIG. 6B is a front view of an optical connection of the fiber optic cable assembly depicted in FIG. 6A according to one or more embodiments of the disclosure.
Figure 6C:
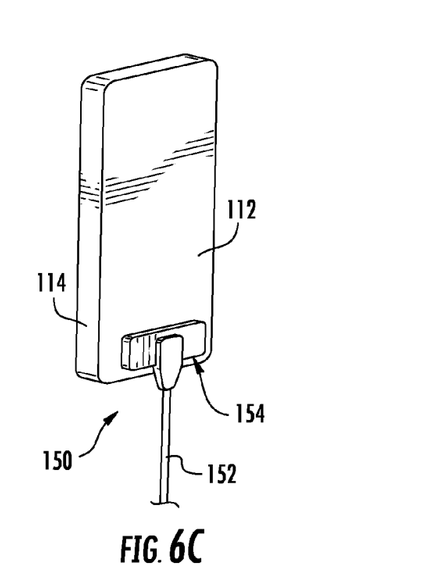
FIG. 6C depicts the fiber optic cable assembly and the electronic device of FIG. 6A in a coupled relationship.

Referring now to FIGS. 6A-6C, embodiments of the present disclosure are also directed to a fiber optic cable assembly 150 for mating with the device optical connection 120 described above. FIG. 6A depicts a fiber optic cable assembly 150 that is decoupled from an electronic device 100 having a device optical connection 120. FIG. 6B is a front view of a mating surface 151 of the fiber optic cable assembly 150 depicted in FIG. 6A. FIG. 6B depicts the fiber optic cable assembly 150 magnetically coupled to the electronic device 100.

The fiber optic cable assembly 150 includes a fiber optic cable 152 having a plurality of optical fibers (not shown in FIGS. 6A-6C) and a cable optical connection 160 comprising an optical module 164 having an optical interface portion 165, and a magnetic coupling portion 162. The cable optical connection 160 is disposed within a mating surface 151 of a connector body 154 of the fiber optic cable assembly 150. The plurality of optical fibers terminates within the connector body, as described in more detail below. The optical interface portion 165 has a surface that may be substantially planar with respect to the mating surface 151 of the connector body 154, in some embodiments.

The illustrated cable optical connection 160 includes a first and second alignment fiducial 169 (e.g., a male cross-shaped alignment fiducial for mating with the alignment fiducial 129 of the device-side optical connection 120). The first and second alignment fiducials 169 are disposed on opposite sides of a plurality of optical channels 168 of the optical interface portion 165. It should be understood that no alignment fiducials may be included in alternative embodiments. The first and second male alignment fiducials 169 may provide alignment along two directions when coupled to the corresponding first and second female alignment fiducials 129 of the device optical connection.

Referring specifically to FIG. 6B, the magnetic coupling portion 162 surrounds the optical module 164 and is configured to magnetically mate with the magnetic coupling portion 122 of the optical connection 120 of the electronic device 100 described above. Accordingly, the magnetic coupling portion 162 includes an array of magnetic regions 163 that are magnetized according to a magnetic coding pattern that is opposite from a magnetic coding pattern of the magnetic coupling portion 122 of the device optical connection 120. When the corresponding alignment fiducials 129, 169 are placed within proximity to each other (i.e., in a mated relationship), the individual magnetic regions 123, 163 are magnetically attracted to each other and thereby align the optical interface portion 125 of the device optical connection 120 with the optical interface portion 165 of cable optical connection 160. More specifically, the magnetic coupling portions 122, 162 provide fine alignment between optical channels of the device and cable optical connections 120, 160.

As shown in FIG. 6C, the magnetic attraction between the magnetic coupling portion 122 of the electronic device 100 and the magnetic coupling portion 162 of the fiber optic cable assembly 150 retain the two components in a mated relationship. The size and configuration of the magnetic coupling portions 122, 162 should be such that the mated relationship between the electronic device 100 and the fiber optic cable assembly 150 is resistant to inadvertent angular forces that may decouple the two devices, such as accidental pulling on the fiber optic cable 152.

Figure 7:
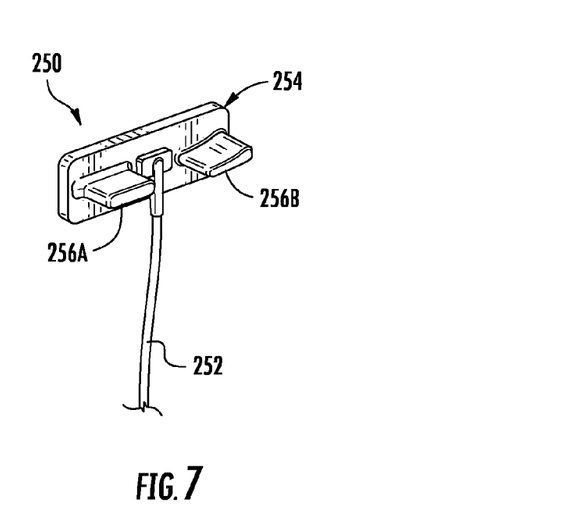
FIG. 7 depicts another fiber optic cable assembly having protrusion features for decoupling the fiber optic cable assembly from an electronic device.

FIG. 7 depicts another embodiment of a fiber optic cable assembly 250 that includes a fiber optic cable 252 terminating at a connector body 254 having two protruding features 256A and 256B. The protruding features 256A and 256B of the illustrated embodiments are configured to enable a user to twist off the fiber optic cable assembly 250 from a mated electronic device. One or more of the protruding features 256A, 256B may be shaped to allow a user to grip the protruding features 256A, 256B and then rotate the connector body 254 to disengage the fiber optic cable assembly 250 from the electronic device.

Figure 8:
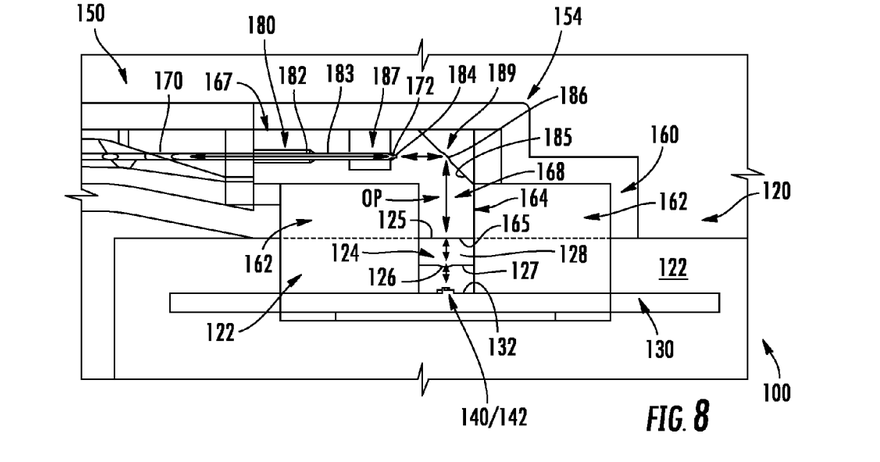
FIG. 8 is a cross-section view of a cable optical connection coupled to a device optical connection according to one or more embodiments of the disclosure.
Figure 9:
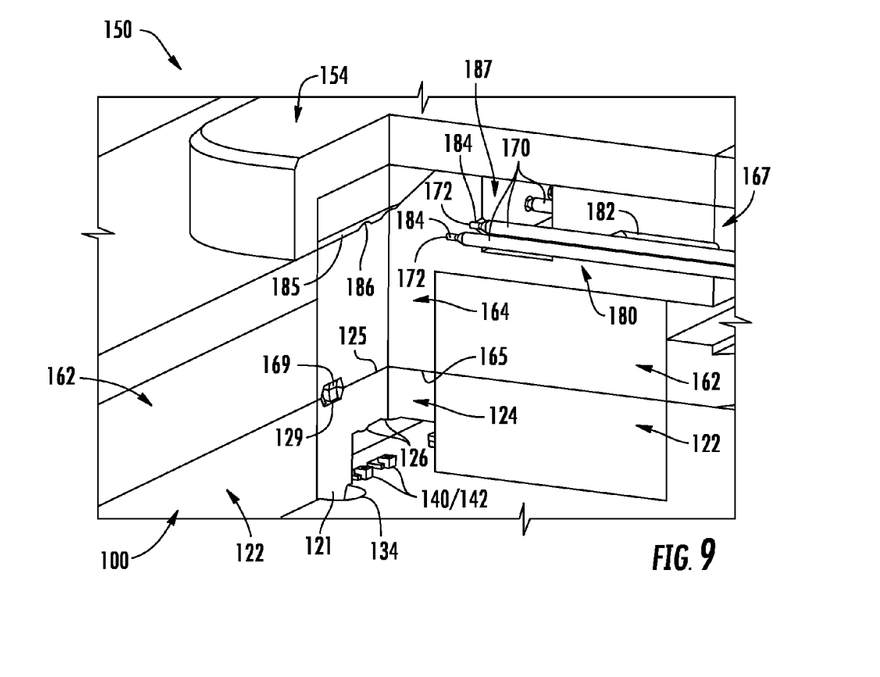
FIG. 9 is a two-axis cross-section view of a cable optical connection coupled to a device optical connection.

FIG. 8 schematically depicts a cross-section view of the cable optical connection 160 depicted in FIG. 6B coupled to the device optical connection 120 depicted in FIGS. 3-5B. FIG. 9 is a two-axis cross-section schematic view showing the cable optical connection 160 mated to the device optical connection 120 for making an optical connection therebetween. The optical module 164 includes a fiber receiving portion 167 that includes a plurality of fiber guides 180 for receiving and securing the optical fibers 170 of the fiber optic cable 152. In some embodiments, each of the fiber guides 180 may include several segments, such as a first segment 182, a second segment 183, and a third lead-in feature segment 184. The first segment 182 may have a larger diameter than the other segments to enable easy insertion of the optical fibers 170 into the fiber receiving portion 167. The diameter of the first segment 182 may taper to a smaller diameter second segment 183 that substantially matches the diameter of the optical fiber 170 to maintain the optical fiber 170 within the optical module 164.

The exemplary optical module 164 also includes an optional well 187 disposed between the fiber receiving portion 167 and the optical interface portion 165; however, bores or groove may also be used. Well 187 may receive an adhesive such as a UV curable adhesive for securing the optical fibers 170 to the optical module 167. The optical fibers 170 extend across the well 187 such that a fiber end 172 of the optical fibers is positioned within the lead-in feature segment 184. The lead-in feature segment 184 is used for aligning and seating the fiber end 172 of the optical fiber 170 within the optical module 164. An appropriate adhesive, such as a UV curable adhesive or the like, may be applied to the well, bores, fibers or grooves for securing the inserted optical fibers 170 to the optical module 164.

The optical module 164 includes a total-internal-reflective (TIR) surface 185 that reflects and redirects optical signals propagating along a turned optical path OP, as indicated by the arrows. An air gap 189 between the optical module 164 and the connector body 154 or another component provides an index of refraction difference that causes the optical signals to be reflected by total internal reflection. The optical paths OP are present within optical channels 168 of the optical module 164. Accordingly, the optical module 164 turns the optical signal to/from the optical fibers 170 to/from the optical interface portion 165. The optical module 164 may be fabricated from a material that is transmissive to wavelengths of the optical signals propagating therethrough. In some embodiments, the TIR surface 185 includes lens features 186 that condition (i.e., focus) the optical signal to be received by the optical fibers 170 or the active components 140, 142.

As shown in FIGS. 8 and 9, the magnetic coupling portion 122 of the device optical connection 120 is magnetically coupled to the magnetic coupling portion 162 of the cable optical connection 160. Further, the first and second male alignment fiducials 169 of the cable optical connection 160 are disposed within the first and second female alignment fiducials 129 of the device optical connection 120 (see FIG. 9). As described above, the male alignment fiducial 169 is a complementary cross-shaped protrusion on the optical module 164 for gross alignment of the optical module with the lens block and is slightly smaller that the female alignment fiducial 129 on the lens block 124 for allowing alignment along two directions.

The respective optical interface portions 125, 165 of the electronic device 100 and the fiber optic cable assembly 150 are aligned and held together by the respective magnetic coupling portions 122, 162. A small gap or profiling between the respective optical interface portions 125, 165 may be desirable to inhibit scratching and like from dirt or debris. In other embodiments, the respective optical interface portions 125, 165 may contact one another. A portion of the device optical connection 120 and/or the cable optical connection 160 may include a coating and/or glass cover for protecting surfaces and/or providing a low friction surface.

As shown in FIG. 8, optical signals follow optical path OP such that they exit the optical fibers 170, are turned by the TIR surface 185, pass through the optical interface portions 125, 165, are focused by the lens elements 126, and are received by the active components 142 (i.e., photodiodes). Similarly, optical signals are emitted by active components 140 (i.e., laser diodes), focused by the lens elements 126, pass through the optical interface portions 125, 165, turned by the TIR surface 185, and received by the optical fibers 170. The resulting design is a simple, robust and cleanable optical connection and fiber optic cable assembly may be employed on many small or large devices such as cell phones, tablets, laptops, TV, refrigerators and the like that have planar surfaces.

Figure 10A:
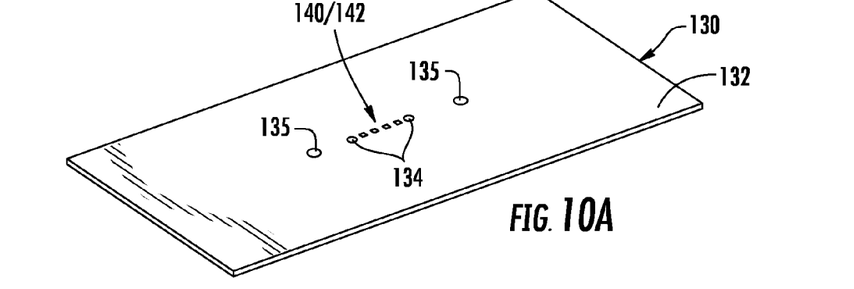
FIGS. 10A-10D depict a process of fabricating an optical connection according to one or more embodiments of the disclosure.
Figure 10B:
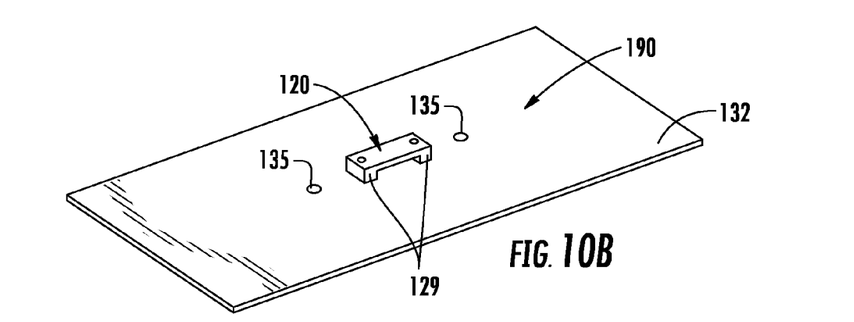

Referring now to FIGS. 10A-10D, an exemplary process for fabricating a device optical connection 120 will now be described. Aspects of the exemplary process described below are also applicable to fabricating a cable optical connection 160. Referring first to FIG. 10A, a circuit board 130 having one or more active components 140, 142 attached to a surface 132 is provided. The one or more active components 140, 142 may be located on the surface 132 of the circuit board 130 with reference to one or more alignment fiducials. The circuit board 130 may also include features or recesses 134 for receiving the lens block 124. As shown in FIG. 10B, a lens block 124 is placed on the circuit board 130. The mounting structures 121 of the lens block 124 are positioned in the recesses 134 of the circuit board and secured with an adhesive. The lens block 124 is precisely aligned with the active components 140, 142. When placing the lens block 124 on the circuit board 130, the lens elements 126 may be used as reference fiducials to align the lens block 124 to the active components 140, 142. In other embodiments, other fiducials may be provided on the lens block 124 for alignment. Further, in some embodiments, fiducials located on the circuit board 130 may be used for alignment rather than the active components 140, 142 themselves. Generally speaking, the optical interface portion is precisely aligned with the active component for providing a suitable optical coupling efficiency.

Figure 10C:
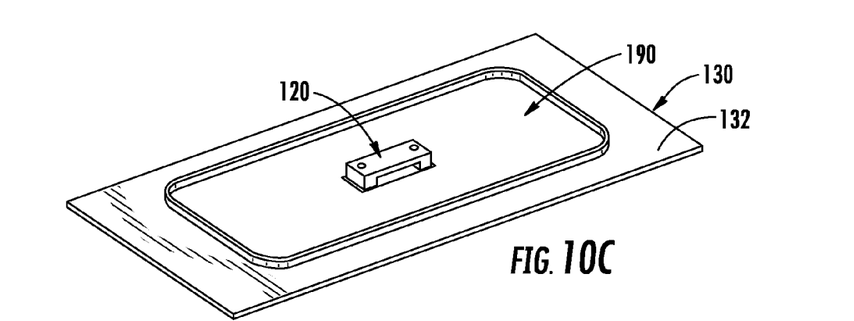

Referring now to FIG. 10C, an optional metallic shield 190 may be placed about the lens block 124 to shield other components within the electronic device from magnetic fields generated by the magnetic coupling portion 122. The metallic shield 190 may be shaped to receive the bulk magnetic material of the magnetic coupling portion 122. The metallic shield 190 may be attached via openings 135 in the circuit board 130, for example.

Figure 10D:
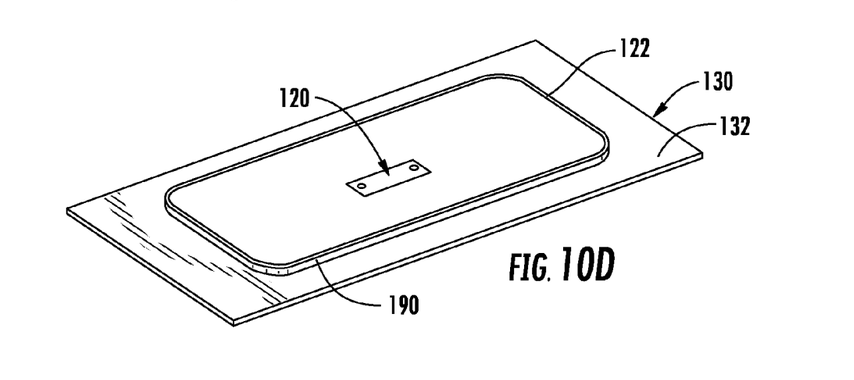

A bulk magnetic material defining the magnetic coupling portion 122 is disposed around the lens block 124, as depicted in FIG. 10D. The bulk magnetic material may be one piece, or multiple pieces to enable optimized lens designs. The bulk magnetic material may be any material capable of being programmed into an array of magnetic regions that define a magnetic coding pattern.

An in situ magnetizing process is one in which the bulk magnetic material is magnetized in precise zones (i.e., desired magnetic regions for the coded magnetic array) in place by referencing the lens block 124, active components 140, 142, and/or electronic device 100 for registration between the optical channels and coded magnetic array of the magnetic coupling portion 122. For example, once the lens block 124 is properly secured to the circuit board 130 and the active components 140, 142 secured thereon, the lens elements 126 may be used as reference points for the writing of the magnetic coding pattern within the bulk magnetic material. The in situ process may advantageously eliminate the need for the assembly of small magnets difficult and time-consuming manufacturing techniques. The lens elements 126 of the lens block 124 or optical module 164 of the fiber optic cable assembly having the optical interface portion may then be aligned such as optically aligned to a device that imparts the coded magnetic properties (the written array) to the bulk magnetic material in a predetermined polarity array. For instance, a vision or actively aligned system may be used to register/align to the optical centers of the optical interface portion before writing the coded magnetic array to the bulk magnetic material.

In some embodiments, an anti-friction coating may be applied to the magnetic coupling portion 122 after magnetization to reduce inadvertent decoupling. Additionally, a cover, such as a glass cover, may also be applied to the lens block 124. Further, anti-reflective coating or other coatings may be applied to the lens block 124 to reduce optical loss of the optical signals.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially" and "about" are utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical connection comprising:
   a lens block comprising an optical interface portion that defines an in-line optical path without an optical turn for optical signals propagating through the lens block; and
   a circuit board, wherein the lens block is attached to a surface of the circuit board; and
   a magnetic coupling portion surrounding at least a portion of the optical interface portion.

2. The optical connection of claim 1, wherein the magnetic coupling portion comprises at least one coded magnetic array.

3. The optical connection of claim 2, wherein the at least one coded magnetic array comprises a plurality of magnetic regions magnetized according to a magnetic coding pattern.

4. The optical connection of claim 1, wherein the magnetic coupling portion comprises one or more individual magnets.

5. The optical connection of claim 1, further comprising at least one alignment fiducial disposed on the lens block adjacent to the optical interface portion.

6. The optical connection of claim 5, wherein the at least one alignment fiducial is a recessed cavity.

7. The optical connection of claim 6, wherein the at least one alignment fiducial is a cross-shaped recess cavity.

8. The optical connection of claim 1, wherein the lens block comprises a lens surface having at least one lens element defining at least one optical channel.

9. The optical connection of claim 8, wherein the at least one lens element comprises at least two adjacent lens elements.

10. The optical connection of claim 9, wherein a spacing between the at least two adjacent lens elements is less than 800 μm.

11. The optical connection of claim 1, wherein:
    the lens block comprises an integrally formed mounting structure; and
    the lens block is coupled to the circuit board by the integrally formed mounting structure.

12. The optical connection of claim 1, further comprising a metallic shield disposed between the magnetic coupling portion and the circuit board.

13. An electronic device comprising:
    a housing defining a major surface and a minor surface; and
    an optical connection disposed in the major surface of the housing, the optical connection comprising:
    a lens block comprising an optical interface portion that defines an in-line optical path without an optical turn for optical signals propagating through the lens block;
    a circuit board, wherein the lens block is attached to a surface of the circuit board; and
    a magnetic coupling portion disposed about at least a portion of the lens block.

14. The electronic device of claim 13, wherein the magnetic coupling portion comprises at least one coded magnetic array.

15. The electronic device of claim 14, wherein the at least one coded magnetic array comprises a plurality of magnetic regions magnetized according to a magnetic coding pattern.

16. The electronic device of claim 13, further comprising a circuit board having one or more active components, wherein:
    the optical interface portion of the lens block is aligned over the one or more active components; and
    an optical axis of the optical connection is generally normal to the circuit board.

17. The electronic device of claim 16, further comprising a metallic shield disposed between the magnetic coupling portion and the circuit board.

18. The electronic device of claim 13, further comprising at least one alignment fiducial disposed on the lens block adjacent to the optical interface portion.

19. The optical connection of claim 18, wherein the at least one alignment fiducial is a recessed cavity.

20. The electronic device of claim 13, wherein the optical interface portion is surface accessible.

21. The electronic device of claim 13, wherein a surface of the optical interface portion is coplanar with the major surface of the housing.

22. The electronic device of claim 13, wherein a surface of the magnetic coupling portion is coplanar with the major surface of the housing.

23. A method of making an optical connection, comprising:
   providing a circuit board having one or more active components;
   placing a lens block on the circuit board, the lens block comprising an optical interface portion defining an in-line optical path without an optical turn for optical signals propagating through the lens block, wherein the lens block comprises at least one integrally formed mounting structure;
   securing the lens block to the circuit board using the at least one integrally formed mounting structure; and
   placing at least one magnetic coupling portion about the lens block, the at least one magnetic coupling portion being a bulk magnetic material.

24. The method of claim 23, further comprising applying a magnetic coding pattern to the bulk magnetic material using one or more reference fiducials, thereby forming a coded magnetic array comprising a plurality of magnetic regions defining the magnetic coding pattern.

25. The method of claim 24, wherein:
   the lens block further comprises a lens surface comprising one or more lens elements substantially aligned with the one or more active components; and
   the magnetic coding pattern is applied to the bulk magnetic material using the one or more lens elements as the one or more reference fiducials.

26. The method of claim 23, further comprising providing a metallic shield about the lens block.

27. The electronic device of claim 13, wherein the magnetic coupling portion comprises a bulk magnetic material surrounding at least a portion of the optical interface portion, the bulk magnetic material providing at least one coded magnetic array.

28. The electronic device of claim 13, wherein:
   the minor surface is an edge of the electronic device; and
   the major surface is a backside of the electronic device.

29. The electronic device of claim 13, wherein:
   the lens block comprises at least one integrally formed mounting structure; and
   the lens block is coupled to the circuit board by the integrally formed mounting structure.

30. The method of claim 23, wherein at least a portion of the at least one integrally formed mounting structure is recessed within a surface of the circuit board.

* * * * *